United States Patent [19]
Ochmann

[11] 3,878,455
[45] Apr. 15, 1975

[54] CIRCUIT ARRANGEMENT FOR MEASURING THE FILAMENT EMISSION CURRENT OF A CATHODE-RAY OR X-RAY TUBE

[75] Inventor: Rudolf Ochmann, Hamburg, Germany

[73] Assignee: U.S. Philips Corporation, New York, N.Y.

[22] Filed: Oct. 3, 1973

[21] Appl. No.: 403,041

[30] Foreign Application Priority Data
Oct. 6, 1972    Germany............................ 2249064

[52] U.S. Cl. ............................ 324/20 CR; 250/416
[51] Int. Cl............................................. G01r 31/22
[58] Field of Search........... 250/401, 416; 324/20 R, 324/20 CR, 22, 24, 23

[56] References Cited
UNITED STATES PATENTS
2,189,894   10/1938   Goldfield et al..................... 250/416
3,543,030   11/1970   Splain................................ 250/416

FOREIGN PATENTS OR APPLICATIONS
1,028,245   4/1958   Germany.............................. 324/24

*Primary Examiner*—Alfred E. Smith
*Assistant Examiner*—Rolf Hille
*Attorney, Agent, or Firm*—Frank R. Trifari

[57] ABSTRACT

The invention describes a simple circuit arrangement for measuring the emission currents of X-ray tubes with zero potential difference. The negative high voltage is applied to the cathode via a primary winding of a current transformer which via diodes is connected in parallel with the filament. The filament alternating voltage renders the diodes alternately conductive and non-conductive, so that the tube current flows in alternate directions through the current transformer. This enables an alternating-current signal which is proportional to the emission (direct) current to be derived from the secondary.

6 Claims, 3 Drawing Figures

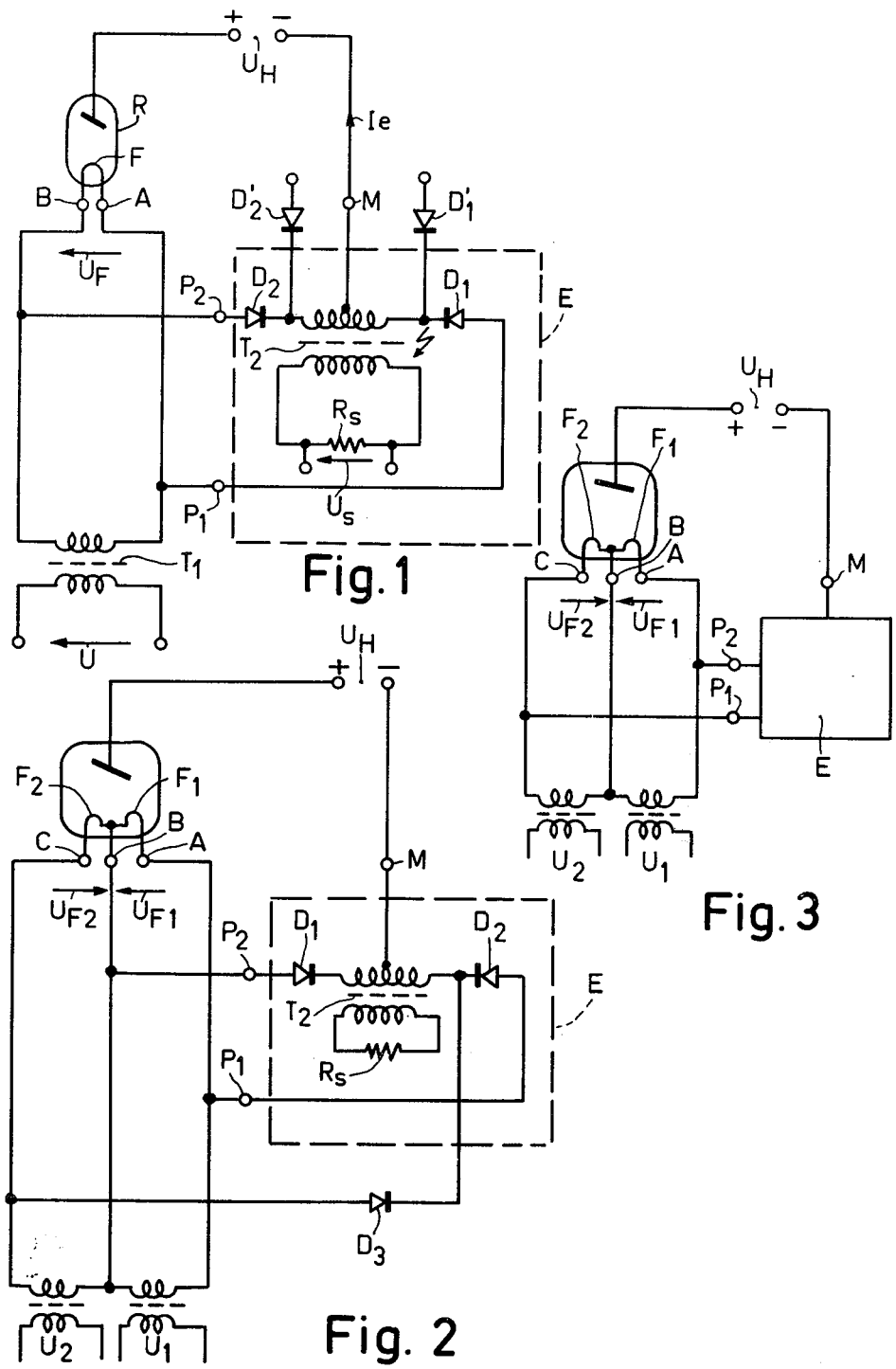

ved.
CIRCUIT ARRANGEMENT FOR MEASURING THE FILAMENT EMISSION CURRENT OF A CATHODE-RAY OR X-RAY TUBE The invention relates to a circuit arrangement for measuring the emission currents of a cathode-ray tube, in particular an X-ray tube, with zero potential difference.

In an operating X-ray tube the cathode and in general the anode also are at a high-voltage potential, the filament voltage for the cathode being supplied via an isolating transformer.

Hitherto emission currents of X-ray tubes as frequently used for medical purposes have in general been measured at a grounded midpoint of the high-voltage supply source (see for example German patent application S 31 160 V IIIc/21g). For this purpose the voltage drop across a measuring resistor is determined. A disadvantage of this method is that firstly when the high voltage is applied the charging currents of all the capacitances, both the stray capacitances and the capacitors provided for smoothing the high voltage, are included in the measurement, and secondly it is not possible to measure the individual emission currents of tubes which are fed in parallel from a high voltage source. Hence, in tubes the cathode and anode of which are at a high-voltage potential a potential-separating transfer of emission current values will be required. Known chopper methods enable direct currents to be transferred and measured with zero potential difference (U.S. Pat. No. 2,575,904, Siemens Zeitschrift (1965) No. 9, pages 971–975). In the said methods controlled mechanical, electromechanical or electronic switches are used for interruputing or modulating the direct current which then is transferred with zero potential difference via a transformer.

It is an object of the present invention to provide a circuit arrangement of the type mentioned at the beginning of this specification which can simply and cheaply be used with circuit elements which are at a high-voltage potential and which do not require an additional transformer or converter for the transmission of control signals for the electronic switches at high-voltage potential. According to the invention this is achieved in that a high voltage is applied to the cathode of the X-ray tube via a current transformer and switches are provided which are controlled by the filament alternating voltage and cause the emission current to flow through the current transformer in alternate directions.

The fact that this enables a few circuit elements which are substantially insensitive to disturbances to be used in the high-voltage circuit of the tube provides the advantage of reducing the susceptibility to damage of the current transfer device especially due to current pulses which may be produced by short-duration high-voltage breakdowns ("spark ignition") of the X-ray tube.

Embodiments of the invention will now be described, by way of example, with reference to the accompanying diagrammatic drawings, in which:

FIG. 1 shows an embodiment of a circuit arrangement according to the invention,

FIG. 2 shows a circuit arrangement according to the invention for double-focus tubes the filaments of which are interconnected at one end, and FIG. 3 shows a modified embodiment of the circuit arrangement of FIG. 2.

Referring now to FIG. 1, filament power for heating a cathode F of an X-ray tube R is supplied in a conventional manner to a filament at high-voltage potential via an isolating transformer $T_1$. Thus a filament voltage $U_F$ is set up between filament terminals A and B. The terminals A and B are connected to input terminals $P_1$ and $P_2$ respectively of a circuit arrangement E for transferring the emission current according to the invention, which circuit arrangement is enclosed by a broken line in the Figure. Consequently, the voltage $U_F$ is also set up between the anodes of diode switches $D_1$ and $D_2$ the cathodes of which are each connected to one end of the primary winding of a current transformer $T_2$. A midpoint M of this winding is connected to the negative terminal of the high-voltage source which feeds the tube R.

The filament alternating voltage $U_F$ renders the diode switches $D_1$ and $D_2$ alternately conductive and non-conductive, causing the emission current $I_e$ of the tube R to flow through the current transformer $T_2$ in alternate directions. The current transformer $T_2$ is loaded at the secondary by a shunt resistor $R_s$ across which an alternating voltage $U_s$ is produced the amplitude of which — except at the change-over instants — is proportional to the variation in time of the emission current $I_e$, if the magnetizing current of the transformer is small enough with respect to the emission current to be measured. The circuit E takes almost no power from the filament-power transformer $T_1$.

In the case of at least two cathodes which are at the same high-voltage potential and only one of which at a time is emitting, the current transfer device E may be extended in that for each alternately emitting cathode two diodes ($D_1'$, $D_2'$) are connected, similarly to the diodes $D_1$, $D_2$ of FIG. 1, to the ends of the primary winding of the current transformer $T_2$.

Most of the commonly used X-ray tubes are double-focus tubes having two filaments which alternately emit in operation. When the filaments are interconnected in the manner shown in FIGS. 2 and 3, as usually is the case, the invention may advantageously be realized by the circuit arrangements shown in FIGS. 2 and 3.

In FIG. 2 the transfer device E for the emission current is extended to include one additional diode $D_3$ the cathode of which is connected to the cathode of the diode $D_1$ and the anode of which is connected to a non-common terminal (C) of a filament. The input terminal $P_2$ of the circuit E is connected to the junction point B of the two filaments, the input terminal $P_1$ being connected to the other "free" end A. The filament voltage $U_{F1}$ and $U_{F2}$ set up across the filaments $F_1$ and $F_2$ respectively preferably are in phase with the voltage at the junction point B.

The voltages $U_{F1}$ and $U_{F2}$ render the diode $D_2$ non-conductive and the diode $D_1$ or $D_3$ conductive during one half cycle and the diodes $D_1$ and $D_3$ non-conductive and the diode $D_2$ conductive during the other half cycle. The emission current alternately flows through either of the two winding halves of the current transformer $T_2$, so that this transformer alternately passes current in one direction and in the other direction. This circuit arrangement ensures that the emission current does not flow through the non-emitting filament and the associated filament transformer of the filament circuit, when the voltage at the emitting filament is higher than that at the non-emitting filament.

A circuit arrangement as shown in FIG. 3, in which the current transfer device E of FIG. 1, i.e. not including an additional diode $D_3$, is alternately used for transferring the emission current of the cathode $F_1$ and of the cathode $F_2$, may be used when the filament voltages $U_{F1}$ and $U_{F2}$ either are in phase opposition or are in phase but greatly differ in amplitude, for in this case the voltage difference is set up between the points $P_1$ and $P_2$ of the current transfer device E. The diodes are switched either by the sum of, or by the sufficiently large difference between, the filament voltages $U_{F1}$ and $U_{F2}$. Consequently, the emission current $I_e$ will alternately flow in opposite directions through the current transformer, using the current paths via the non-emitting filament and the associated filament transformer.

The use of semiconductor diodes of appropriate values in the high-voltage circuit of the X-ray tube enables destruction of the semiconductor-equipped emission-current transfer device to be prevented in the case of "spark ignition" of the tube. Furthermore, advantageously controlled-avalanche diodes are used, preventing disturbances due to static charging as a result of potential shifts at the cathode.

What is claimed is:

1. Circuit arrangement for measuring the filament emission current of a cathode-ray tube, comprising:
   a first transformer having means for electrically connecting a secondary winding thereof across a filament of a cathode-ray tube and having means for electrically connecting a primary winding thereof to a suitable source of A.C. voltage for driving said filament with an alternating current;
   a second transformer having a primary winding with a center tap and a secondary winding;
   means for electrically connecting a source of suitably high D.C. voltage between an anode of said tube and said center tap of said primary winding of said second transformer;
   a pair of diodes having their respective anodes electrically connected to opposite ends of said secondary winding of said first transformer and having their respective cathodes electrically connected to opposite ends of said primary winding of said second transformer; and
   a resistance electrically connected between opposite ends of said secondary winding of said second transformer developing thereacross a voltage substantially proportional to the filament emission current of said tube.

2. Circuit arrangement as defined in claim 1 and further comprising an X-ray tube having an anode and having a filament across which is electrically connected said secondary winding of said first transformer.

3. Circuit arrangement for measuring the filament emission current of a cathode-ray tube, comprising:
   a cathode-ray tube having an anode and first and second filaments, one end of said first element being electrically connected to one end of said second filament;
   first and second transformers having respectively first and second secondary windings, one end of said first secondary winding being electrically connected to one end of said second secondary winding and being electrically connected to said one ends of said first and second filaments, the other end of said first secondary winding being electrically connected to the other end of said first filament, the other end of said second secondary winding being electrically connected to the other end of said second filament, said first and second transformers having respectively first and second primary windings and means for respectively connecting said first and second primary windings to a suitable source of A.C. voltage for driving said first and second filaments respectively with an alternating current;
   a third transformer having a primary winding with a center tap and a secondary winding;
   means for electrically connecting a source of suitably high D.C. voltage between an anode of said tube and said center tap of said primary winding of said third transformer;
   a first diode having its anode electrically connected to said one ends of said first and second secondary windings of said first and second transformers and having its cathode electrically connected to one end of said primary winding of said third transformer;
   second and third diodes having their respective anodes electrically connected to said other ends of said first and second secondary windings respectively of said first and second transformers and having their cathodes electrically connected to the other end of said primary winding of said third transformer; and
   a resistance electrically connected between opposite ends of said secondary winding of said third transformer developing thereacross a voltage substantially proportional to the filament emission current of said tube.

4. Circuit arrangement as defined in claim 3 wherein said cathode-ray tube is a double-focus X-ray tube.

5. Circuit arrangement for measuring the filament emission current of a cathode-ray tube, comprising:
   a cathode-ray tube having an anode and first and second filaments, one end of said first filament being electrically connected to one end of said second filament;
   first and second transformers having respectively first and second secondary windings, one end of said first secondary winding being electrically connected to one end of said second secondary winding and being electrically connected to said one ends of said first and second filaments, the other end of said first secondary winding being electrically connected to the other end of said first filament, the other end of said second secondary winding being electrically connected to the other end of said second filament, said first and second transformers having respectively first and second primary windings and means for respectively connecting said first and second primary windings to a suitable source of A.C. voltage for driving said first and second filaments respectively with an alternating current;
   a third transformer having a primary winding with a center tap and a secondary winding;
   means for electrically connecting a source of suitably high D.C. voltage between an anode of said tube and said center tap of said primary winding of said third transformer;

a pair of diodes having their respective anodes electrically connected to said other ends of said first and second secondary windings respectively of said first and second transformers and having their cathodes electrically connected to opposite ends of said primary winding of said third transformer; and a resistance electrically connected between opposite ends of said secondary winding of said third transformer developing thereacross a voltage substantially proportional to the filament emission current of said tube.

6. Circuit arrangement as defined in claim 5 wherein said cathode-ray tube is a double-focus X-ray tube.

* * * * *